United States Patent
Matsumoto et al.

(10) Patent No.: US 10,367,969 B2
(45) Date of Patent: Jul. 30, 2019

(54) MANAGEMENT SYSTEM, IMAGE FORMING APPARATUS, MANAGEMENT SERVER, AND RECORDING MEDIUM

(71) Applicant: Kyocera Document Solutions Inc., Osaka (JP)

(72) Inventors: Atsushi Matsumoto, Osaka (JP); Jaclyn Tiffanie Tan, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/145,249

(22) Filed: Sep. 28, 2018

(65) Prior Publication Data

US 2019/0098169 A1    Mar. 28, 2019

(30) Foreign Application Priority Data

Sep. 28, 2017  (JP) ................... 2017-188078

(51) Int. Cl.
*H04N 1/327*  (2006.01)
*H04N 1/00*  (2006.01)

(52) U.S. Cl.
CPC ..... *H04N 1/32747* (2013.01); *H04N 1/00344* (2013.01); *H04N 1/32732* (2013.01)

(58) Field of Classification Search
CPC .......... H04N 1/32747; H04N 1/00344; H04N 1/32732
See application file for complete search history.

(56) References Cited

U.S. PATENT DOCUMENTS

2017/0171410 A1*  6/2017  Harada ............. H04N 1/00891

FOREIGN PATENT DOCUMENTS

JP  2004-289313 A  10/2004

* cited by examiner

*Primary Examiner* — Kent Yip
(74) *Attorney, Agent, or Firm* — HEA Law PLLC

(57) ABSTRACT

A management system includes an image forming apparatus and a management server. The management server manages the image forming apparatus. The image forming apparatus is configured to switch a constant connection with the management server by a protocol for the constant connection between enabling and disabling. The management server is configured to operate the image forming apparatus via the constant connection.

6 Claims, 15 Drawing Sheets

27b

| Connection Type | XMPP Connection Permission Mode |
|---|---|
| Automatic Switch Information | ON |
| Automatic Switching Time | 600 |

MANAGEMENT SYSTEM, IMAGE FORMING APPARATUS, MANAGEMENT SERVER, AND RECORDING MEDIUM

INCORPORATION BY REFERENCE

This application is based upon, and claims the benefit of priority from, corresponding Japanese Patent Application No. 2017-188078 filed in the Japanese Patent Office on Sep. 28, 2017, and the entire contents of which are incorporated herein by reference.

BACKGROUND

Unless otherwise indicated herein, the description in this section is not prior art to the claims in this application and is not admitted to be prior art by inclusion in this section.

As a typical management system that manages an image forming apparatus, a management system that includes an image forming apparatus and a management server that manages the image forming apparatus has been known. In this management system, the image forming apparatus transmits information on the image forming apparatus to the management server. The information on the image forming apparatus includes, for example, information on remaining amounts of expendables in the image forming apparatus, information on presence/absence of a component needing to be replaced in the image forming apparatus, and information on abnormal occurrence in the image forming apparatus. Then, the management server manages the information on the image forming apparatus received from the image forming apparatus.

SUMMARY

A management system according to one aspect of the disclosure includes an image forming apparatus and a management server. The management server manages the image forming apparatus. The image forming apparatus is configured to switch a constant connection with the management server by a protocol for the constant connection between enabling and disabling. The management server is configured to operate the image forming apparatus via the constant connection.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
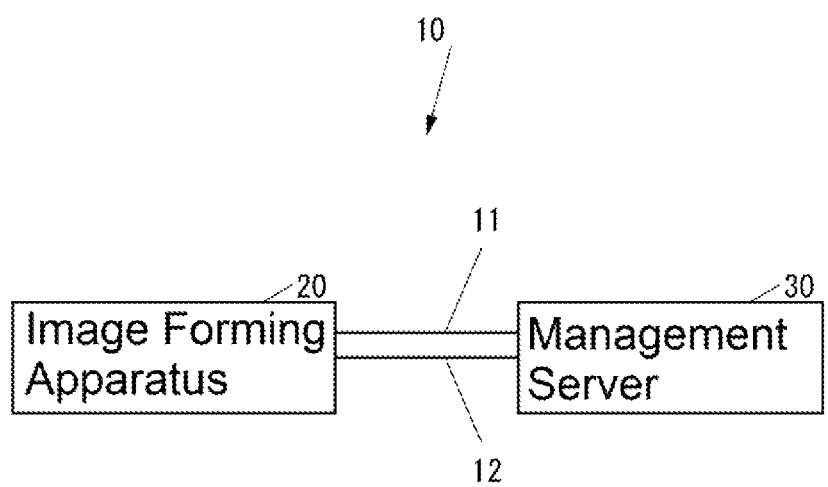
FIG. 1 illustrates a block diagram of a management system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to drawings.

First, a configuration of a management system according to one embodiment of the disclosure will be described.

FIG. 1 illustrates a block diagram of a management system 10 according to the embodiment.

As illustrated in FIG. 1, the management system 10 includes an image forming apparatus 20, and a management server 30 that manages the image forming apparatus 20.

The image forming apparatus 20 is, for example, a multifunction peripheral (MFP), a printer-only machine, a copy-only machine, a scanner-only machine, or a FAX-only machine.

The management server 30 may be configured from one computer, or may be configured from a plurality of computers.

A Hypertext Transfer Protocol (HTTP) connection 11 can be established between the image forming apparatus 20 and the management server 30. The HTTP connection 11 is a temporal connection with an HTTP as a protocol for the temporal connection. In this description, the HTTP includes a Hypertext Transfer Protocol Secure (HTTPS).

An Extensible Messaging and Presence Protocol (XMPP) connection 12 can be established between the image forming apparatus 20 and the management server 30. The XMPP connection 12 is a constant connection with an XMPP as a protocol for a continuous connection, that is, the constant connection. When the XMPP connection 12 has been established, the image forming apparatus 20 can transmit information indicative of a connection state of the image forming apparatus 20 itself in the XMPP connection 12 to the management server 30 via the XMPP connection 12 in real-time, and the management server 30 can know the connection state of the image forming apparatus 20 in the XMPP connection 12 in real-time, based on the information transmitted from the image forming apparatus 20 via the XMPP connection 12.

The management system 10 can include at least one image forming apparatus having a configuration similar to that of the image forming apparatus 20 other than the image forming apparatus 20.

The management server 30 can manage a plurality of image forming apparatuses included in the management system 10. The management server 30 receives information on the image forming apparatus (hereinafter referred to as "device information") from each of the managing image forming apparatuses to manage the received device information. Here, as the device information, for example, there is information on various errors, such as information on a system error that has occurred in the image forming apparatus, error information indicative of a paper jam that has occurred in the image forming apparatus, and error information indicative of a component failure that has occurred in the image forming apparatus. As the device information, for example, there is information on remaining amounts of expendables in the image forming apparatus. As the device information, for example, there is information on a current firmware version in the image forming apparatus. As the device information, for example, there is information on properties of the image forming apparatus, such as a model name, a host name, and a serial number of the image forming apparatus.

Figure 2:
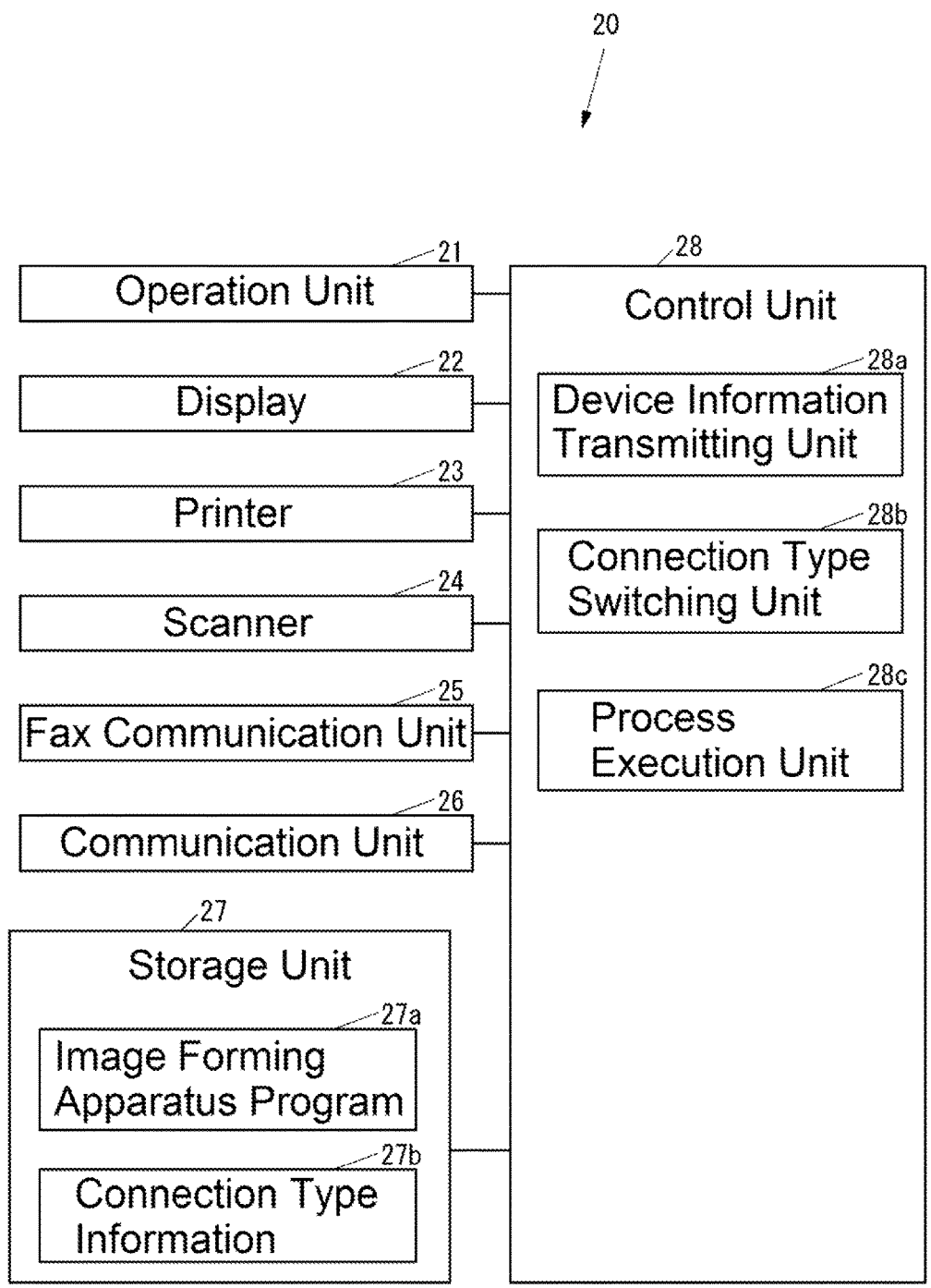
FIG. 2 illustrates a block diagram of an image forming apparatus according to the one embodiment when the image forming apparatus is an MFP.

FIG. 2 illustrates a block diagram of the image forming apparatus 20 when the image forming apparatus 20 is an MFP.

The image forming apparatus 20 illustrated in FIG. 2 includes an operation unit 21, a display 22, a printer 23, a scanner 24, a fax communication unit 25, a communication unit 26, a storage unit 27, and a control unit 28. The operation unit 21 is an input device such as a button to which various operations are input. The display 22 is a display device such as a liquid crystal display (LCD) that displays various kinds of information. The printer 23 is a print device that prints an image on a recording medium such as a paper sheet. The scanner 24 is a reading device that reads an image from an original document. The fax communication unit 25 is a fax device that performs fax communication with an external facsimile device (not illustrated) via a communication line such as a dial-up line. The communication unit 26 is a communication device that communicates with an external device via a network such as a local area network (LAN), or the Internet, or directly by wire or wirelessly without the network. The storage unit 27 is a non-volatile storage device such as a semiconductor memory and a hard disk drive (HDD) that store various kinds of information. The control unit 28 controls the whole image forming apparatus 20.

The storage unit 27 stores an image forming apparatus program 27a. The image forming apparatus program 27a, for example, may be installed in the image forming apparatus 20 at production stage of the image forming apparatus 20, may be additionally installed in the image forming apparatus 20 from an external storage medium such as a universal serial bus (USB) flash drive, or may be additionally installed in the image forming apparatus 20 via the network.

The storage unit 27 can store connection type information 27b indicative of information regarding a type of a connection (hereinafter referred to as a "connection type") with the management server 30 (see FIG. 1). Here, as the connection type, there are a mode that permits the XMPP connection 12 (see FIG. 1) (hereinafter referred to as an "XMPP connection permission mode") and a mode that does not permit the XMPP connection 12 (hereinafter referred to as an "XMPP connection non-permission mode"). The XMPP connection permission mode is a mode that enables the XMPP connection 12. The XMPP connection non-permission mode is a mode that disables the XMPP connection 12.

Figure 3:
FIG. 3 illustrates exemplary connection type information illustrated in FIG. 2.

FIG. 3 illustrates exemplary connection type information 27b.

As illustrated in FIG. 3, the connection type information 27b includes a current connection type, automatic switch information indicative of whether the connection type is automatically switched or not, and an automatic switch reference time indicative of a time as a reference to automatically switch the connection type, for example, in the number of seconds. Here, the automatic switch information can take any value of "ON" indicative of automatically switching the connection type and "OFF" indicative of not automatically switching the connection type.

A default connection type in the connection type information 27b is the XMPP connection non-permission mode.

The control unit 28 illustrated in FIG. 2 includes, for example, a central processing unit (CPU), a read-only memory (ROM) that stores a program and various data, and a random-access memory (RAM) used as a work area of the CPU. The CPU executes the program stored in the ROM or the storage unit 27.

The control unit 28 executes the image forming apparatus program 27a to ensure a device information transmitting unit 28a, a connection type switching unit 28b, and a process execution unit 28c. The device information transmitting unit 28a transmits the device information of the image forming apparatus 20 to the management server 30 via the HTTP connection 11 (see FIG. 1). The connection type switching unit 28b switches the connection type. The process execution unit 28c executes a process corresponding to an operation by the management server 30.

Figure 4:
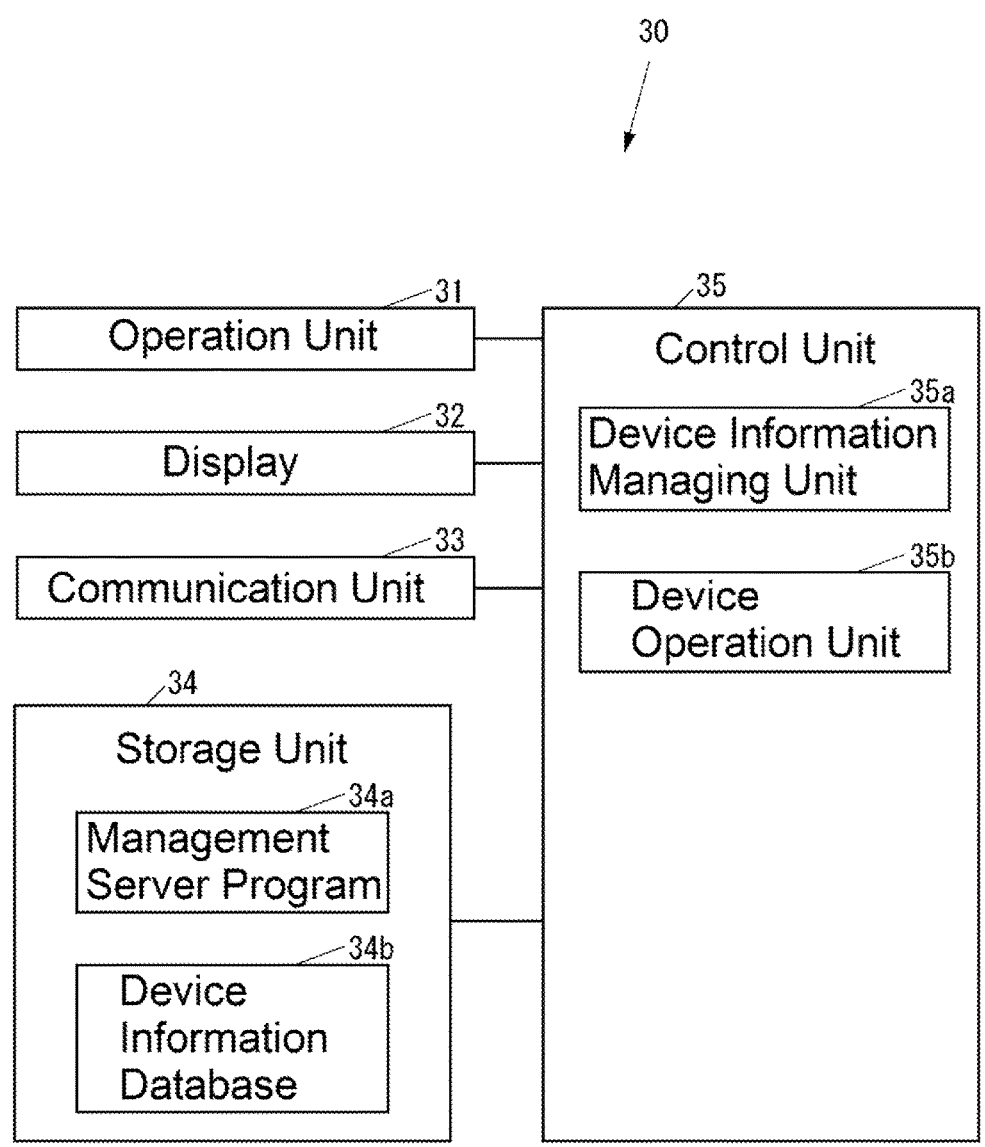
FIG. 4 illustrates a block diagram of a management server according to the one embodiment when the management server is achieved by one computer.

FIG. 4 illustrates a block diagram of the management server 30 when the management server 30 is achieved by one computer.

The management server 30 illustrated in FIG. 4 includes an operation unit 31, a display 32, a communication unit 33, a storage unit 34, and a control unit 35. The operation unit 31 is an input device such as a keyboard and a computer mouse to which various operations are input. The display 32 is a display device such as an LCD that displays various kinds of information. The communication unit 33 is a communication device that communicates with an external device via the network such as the LAN or the Internet, or directly by wire or wirelessly without the network. The storage unit 34 is a non-volatile storage device such as a semiconductor memory and an HDD that store various kinds of information. The control unit 35 controls the whole management server 30.

The storage unit 34 stores a management server program 34a. The management server program 34a, for example, may be installed in the management server 30 at production stage of the management server 30, may be additionally installed in the management server 30 from an external storage medium such as a USB flash drive, a compact disk (CD), and a digital versatile disk (DVD), or may be additionally installed in the management server 30 via the network.

The storage unit 34 can store a device information database 34b to manage the device information.

The control unit 35 includes, for example, a CPU, a ROM that stores a program and various data, and a RAM used as a work area of the CPU. The CPU executes the program stored in the ROM or the storage unit 34.

The control unit 35 executes the management server program 34a to ensure a device information managing unit 35a that manages the device information, and a device operation unit 35b that operates the image forming apparatus 20.

The following describes a behavior of the management system 10.

First, a description will be given of a behavior of the image forming apparatus 20 when the connection type is set.

Figure 5:
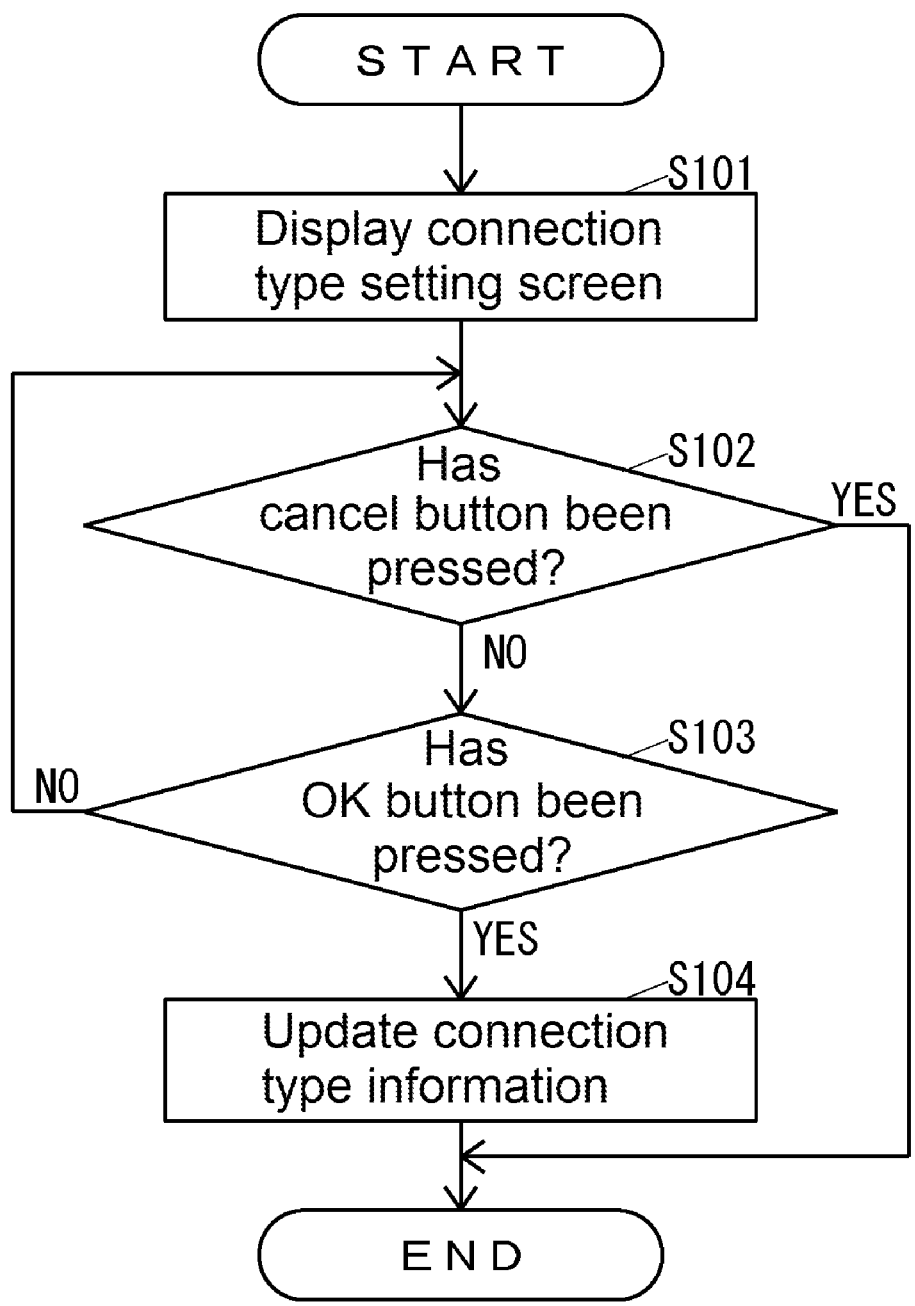
FIG. 5 illustrates a behavior of the image forming apparatus according to the one embodiment when a connection type is set.

FIG. 5 illustrates the behavior of the image forming apparatus 20 when the connection type is set.

When an instruction to start a process to set the connection type is issued via the operation unit 21, the connection type switching unit 28b of the image forming apparatus 20 starts the behavior illustrated in FIG. 5.

As illustrated in FIG. 5, the connection type switching unit 28b displays a screen for setting the connection type (hereinafter referred to as a "connection type setting screen") on the display 22 (Step S101).

Figure 6:
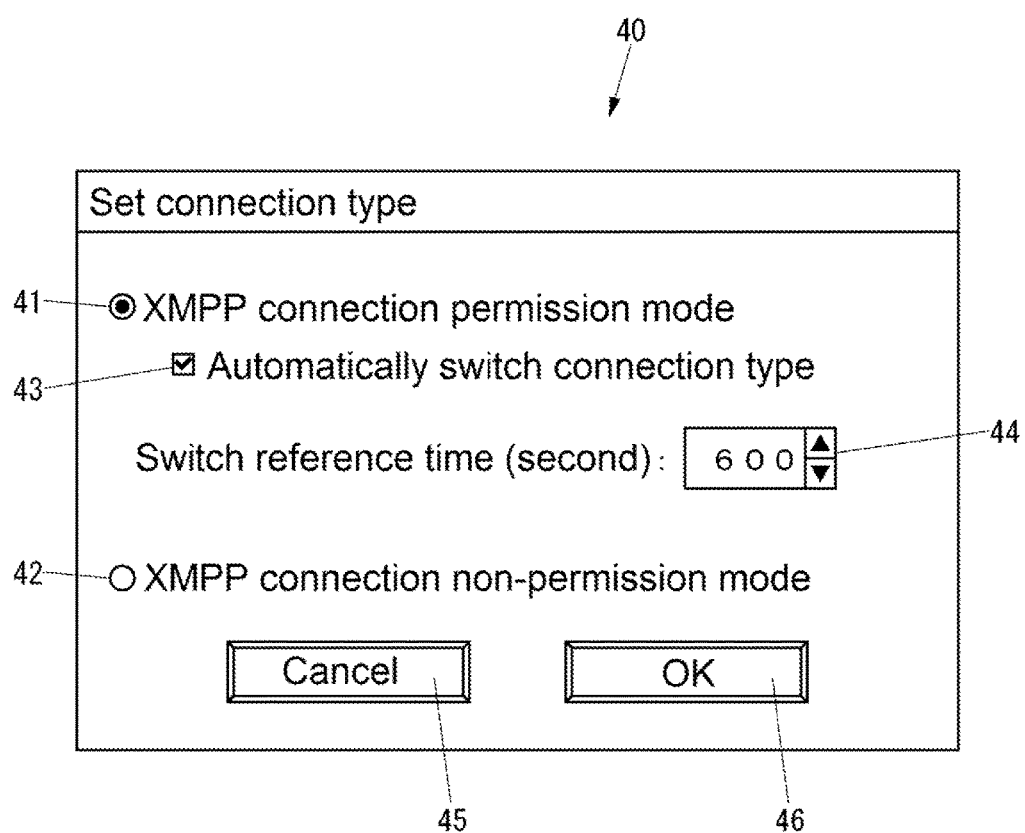
FIG. 6 illustrates an exemplary connection type setting screen displayed in the behavior illustrated in FIG. 5.

FIG. 6 illustrates an exemplary connection type setting screen 40 displayed at Step S101.

As illustrated in FIG. 6, the connection type setting screen 40 includes a radio button 41 where the XMPP connection permission mode is specified as the connection type, and a radio button 42 where the XMPP connection non-permission mode is specified as the connection type. Constantly, only any one of the radio button 41 and the radio button 42 has been selected.

The connection type setting screen 40 includes a check box 43 for specifying whether the connection type is automatically switched or not. The check box 43 can be operated only when the radio button 41 has been selected. A state where the check box 43 has been checked indicates that the connection type is automatically switched. A state where the check box 43 has not been checked indicates that the connection type is not automatically switched.

The connection type setting screen 40 includes a spin box 44 for specifying a time as a reference to automatically switch the connection type. The spin box 44 can be operated only when the check box 43 has been checked.

The connection type setting screen 40 includes a cancel button 45 to abort the setting of the connection type, and an OK button 46 to execute the setting of the connection type.

As illustrated in FIG. 5, the connection type switching unit 28b determines whether the cancel button 45 has been pressed or not (Step S102) after the process at Step S101.

When the connection type switching unit 28b determines that the cancel button 45 has been pressed at Step S102, the connection type switching unit 28b ends the behavior illustrated in FIG. 5.

When the connection type switching unit 28b determines that the cancel button 45 has not been pressed at Step S102, the connection type switching unit 28b determines whether the OK button 46 has been pressed or not (Step S103).

When the connection type switching unit 28b determines that the OK button 46 has not been pressed at Step S103, the connection type switching unit 28b executes the process at Step S102.

When the connection type switching unit 28b determines that the OK button 46 has been pressed, the connection type switching unit 28b updates the connection type information 27b corresponding to the states of the radio button 41, the radio button 42, the check box 43, and the spin box 44 at the point when the OK button 46 has been pressed (Step S104). Specifically, the connection type switching unit 28b sets the connection type in the connection type information 27b to the XMPP connection permission mode when the radio button 41 has been selected, and sets the connection type in the connection type information 27b to the XMPP connection non-permission mode when the radio button 42 has been selected. The connection type switching unit 28b sets the automatic switch information to "ON" when the check box 43 has been checked, and sets the automatic switch information to "OFF" when the check box 43 has not been checked. The connection type switching unit 28b sets an automatic switch reference time to a numerical value specified in the spin box 44.

The connection type switching unit 28b ends the behavior illustrated in FIG. 5 after the process at Step S104.

It is assumed that a situation where the connection type in the connection type information 27b is set to the XMPP connection permission mode includes, for example, a situation where, when a service person of the image forming apparatus 20 desires to remotely operate the image forming apparatus 20 from the management server 30, the service person requests a user of the image forming apparatus 20 to set the connection type in the connection type information 27b to the XMPP connection permission mode through means of communication such as a telephone, and a situation where, when the user of the image forming apparatus 20 wants the service person to remotely operate the image forming apparatus 20 from the management server 30, the user of the image forming apparatus 20 sets the connection type in the connection type information 27b to the XMPP connection permission mode.

The following describes a behavior of the management system 10 when the image forming apparatus 20 is registered as a management object in the management server 30.

Figure 7:
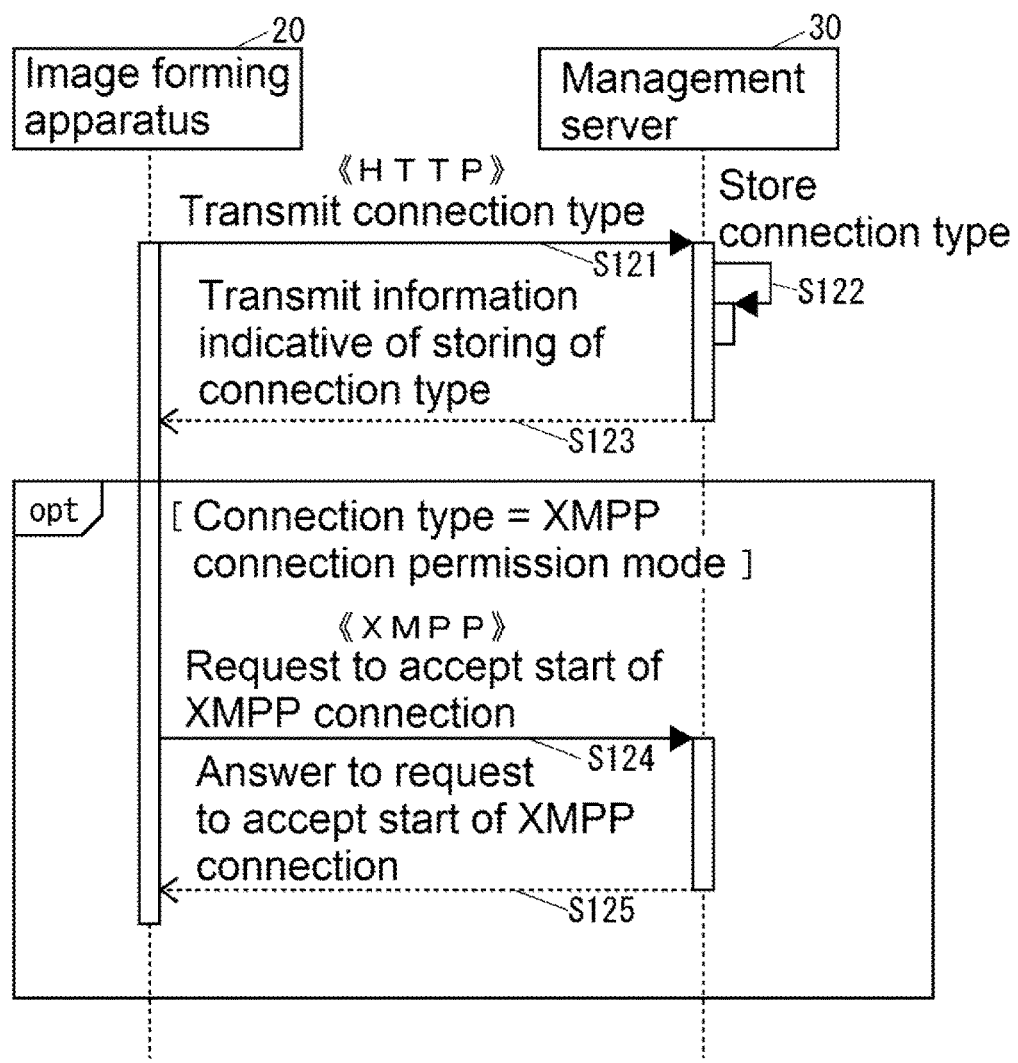
FIG. 7 illustrates a behavior of the management system according to the one embodiment when the image forming apparatus is registered as a management object in the management server.

FIG. 7 illustrates the behavior of the management system 10 when the image forming apparatus 20 is registered as the management object in the management server 30.

The control unit 28 of the image forming apparatus 20 executes the behavior illustrated in FIG. 7 when the image forming apparatus 20 is registered as the management object in the management server 30.

As illustrated in FIG. 7, the device information transmitting unit 28a of the image forming apparatus 20 transmits the connection type in the connection type information 27b to the management server 30 via the HTTP connection 11 (Step S121). Here, the connection type in the connection type information 27b is one in the device information of the image forming apparatus 20.

When the device information managing unit 35a of the management server 30 receives the connection type transmitted from the image forming apparatus 20 at Step S121, the device information managing unit 35a stores the received connection type in the device information database 34b (Step S122) to transmit information that shows that the connection type of the image forming apparatus 20 has been stored in the device information database 34b to the image forming apparatus 20 (Step S123).

When the connection type switching unit 28b of the image forming apparatus 20 receives the information transmitted from the management server 30 at Step S123, the connection type switching unit 28b requests the management server 30 to accept a start of the XMPP connection 12 while the connection type transmitted at Step S121 is the XMPP connection permission mode (Step S124).

When the device operation unit 35b of the management server 30 is requested to accept the start of the XMPP connection 12 by the image forming apparatus 20 at Step S124, the device operation unit 35b answers the request to accept the start of the XMPP connection 12 to the image forming apparatus 20 (Step S125).

As described above, the XMPP connection 12 is started.

When the connection type switching unit 28b of the image forming apparatus 20 receives the information transmitted from management server 30 at Step S123, the connection type switching unit 28b does not execute the process at Step S124 while the connection type transmitted at Step S121 is the XMPP connection non-permission mode. That is, the XMPP connection 12 is not started when the connection type is the XMPP connection non-permission mode.

The following describes a behavior of the management system 10 when the image forming apparatus 20 transmits the device information of the image forming apparatus 20 to the management server 30.

Figure 8:
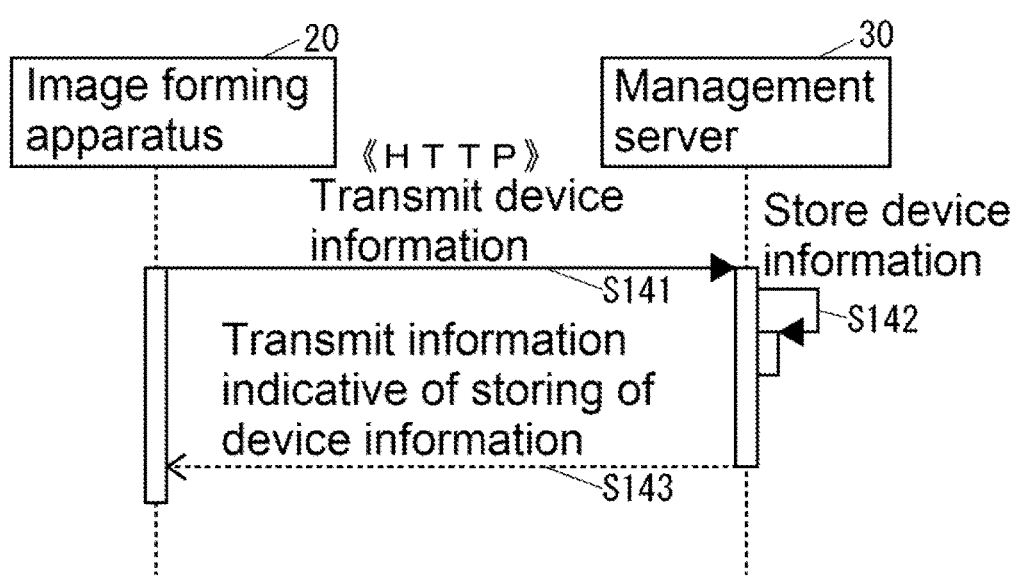
FIG. 8 illustrates a behavior of the management system according to the one embodiment when the image forming apparatus transmits device information of the image forming apparatus to the management server.

FIG. 8 illustrates the behavior of the management system 10 when the image forming apparatus 20 transmits the device information of the image forming apparatus 20 to the management server 30.

When the image forming apparatus 20 has been registered as the management object in the management server 30, the device information transmitting unit 28a of the image forming apparatus 20 executes the behavior illustrated in FIG. 8 at a specific timing such as a periodic timing.

As illustrated in FIG. 8, the device information transmitting unit 28a transmits the device information of the image forming apparatus 20 to the management server 30 via the HTTP connection 11 (Step S141).

When the device information managing unit 35a of the management server 30 receives the information transmitted from the image forming apparatus 20 at Step S141, the device information managing unit 35a stores the received information in the device information database 34b (Step S142), and then, transmits information that shows that the device information of the image forming apparatus 20 has been stored in the device information database 34b to the image forming apparatus 20 (Step S143).

The following describes a behavior of the management system 10 when the connection type in the connection type information 27b is switched from the XMPP connection non-permission mode to the XMPP connection permission mode in a state where the image forming apparatus 20 has been registered as the management object in the management server 30.

Figure 9:
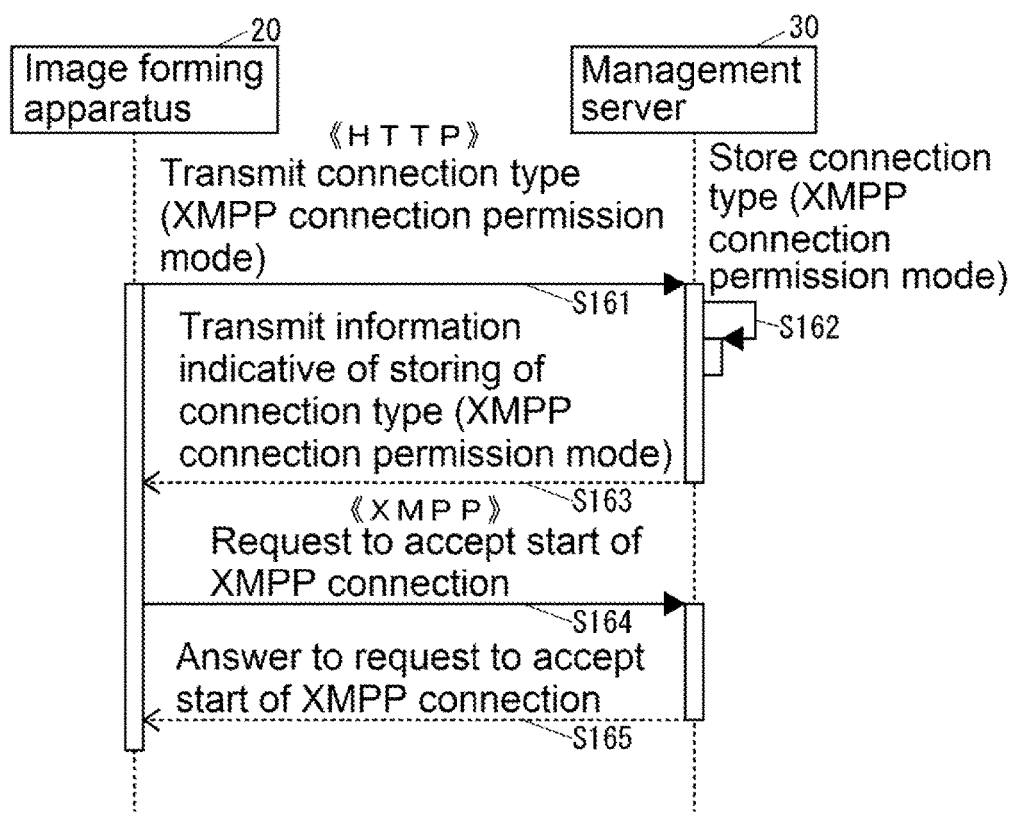
FIG. 9 illustrates a behavior of the management system according to the one embodiment when, in a state where the image forming apparatus has been registered as the management object in the management server, the connection type in the connection type information is switched from an XMPP connection non-permission mode to an XMPP connection permission mode.

FIG. 9 illustrates the behavior of the management system 10 when the connection type in the connection type information 27b is switched from the XMPP connection non-permission mode to the XMPP connection permission mode in the state where the image forming apparatus 20 has been registered as the management object in the management server 30.

The control unit 28 of the image forming apparatus 20 executes the behavior illustrated in FIG. 9 when the connection type in the connection type information 27b is switched from the XMPP connection non-permission mode to the XMPP connection permission mode in the state where the image forming apparatus 20 has been registered as the management object in the management server 30.

As illustrated in FIG. 9, the device information transmitting unit 28a of the image forming apparatus 20 transmits the connection type in the connection type information 27b to the management server 30 via the HTTP connection 11 (Step S161).

When the device information managing unit 35a of the management server 30 receives the connection type transmitted from the image forming apparatus 20 at Step S161, the device information managing unit 35a executes processes of Steps S162 and S163, similarly to Steps S122 and S123.

When the connection type switching unit 28b of the image forming apparatus 20 receives the information transmitted from the management server 30 at Step S163, the connection type switching unit 28b requests the management server 30 to accept the start of the XMPP connection 12 (Step S164).

When the device operation unit 35b of the management server 30 is requested to accept the start of the XMPP connection 12 by the image forming apparatus 20 at Step S164, the device operation unit 35b answers the request to accept the start of the XMPP connection 12 to the image forming apparatus 20 (Step S165).

As described above, the XMPP connection 12 is started.

The following describes a behavior of the management server 30 when a notice of the device information is given.

Figure 10:
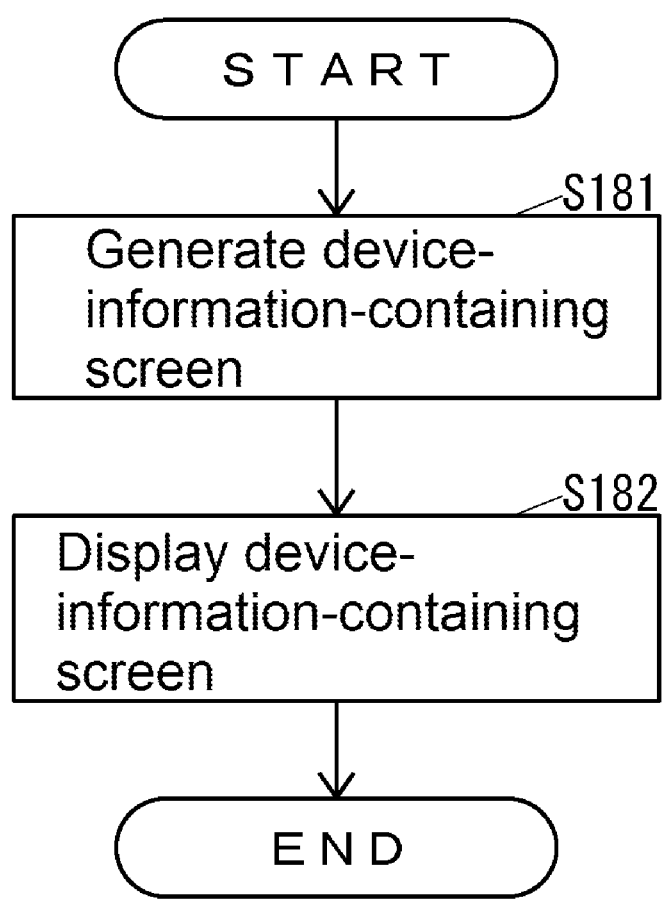
FIG. 10 illustrates a behavior of the management server according to the one embodiment when a notice of the device information is given.

FIG. 10 illustrates the behavior of the management server 30 when the notice of the device information is given.

The control unit 35 of the management server 30 executes the behavior illustrated in FIG. 10 when an instruction to give notice of the device information is issued via the operation unit 31.

As illustrated in FIG. 10, the device information managing unit 35a of the management server 30 generates a screen containing the device information (hereinafter referred to as a "device-information-containing screen") for which the instruction has been issued via the operation unit 31 in the device information stored in the device information database 34b (Step S181).

Next, the device information managing unit 35a displays the device-information-containing screen generated at Step S181 on the display 32 (Step S182), and then, ends the behavior illustrated in FIG. 10.

The management server 30 receives the instruction to give notice of the device information via the operation unit 31 to display the device-information-containing screen on the display 32 in the behavior illustrated in FIG. 10. However, the management server 30 also can receive the instruction to give notice of the device information from a computer such as an external personal computer (PC) via the communication unit 33, not receiving the instruction via the operation unit 31. When the management server 30 receives the instruction to give notice of the device information from the external computer, the management server 30 may transmit the information on the device-information-containing screen to a computer as a transmission source of the instruction to give notice of the device information via the communication unit 33, not displaying the device-information-containing screen on the display 32.

Figure 11:
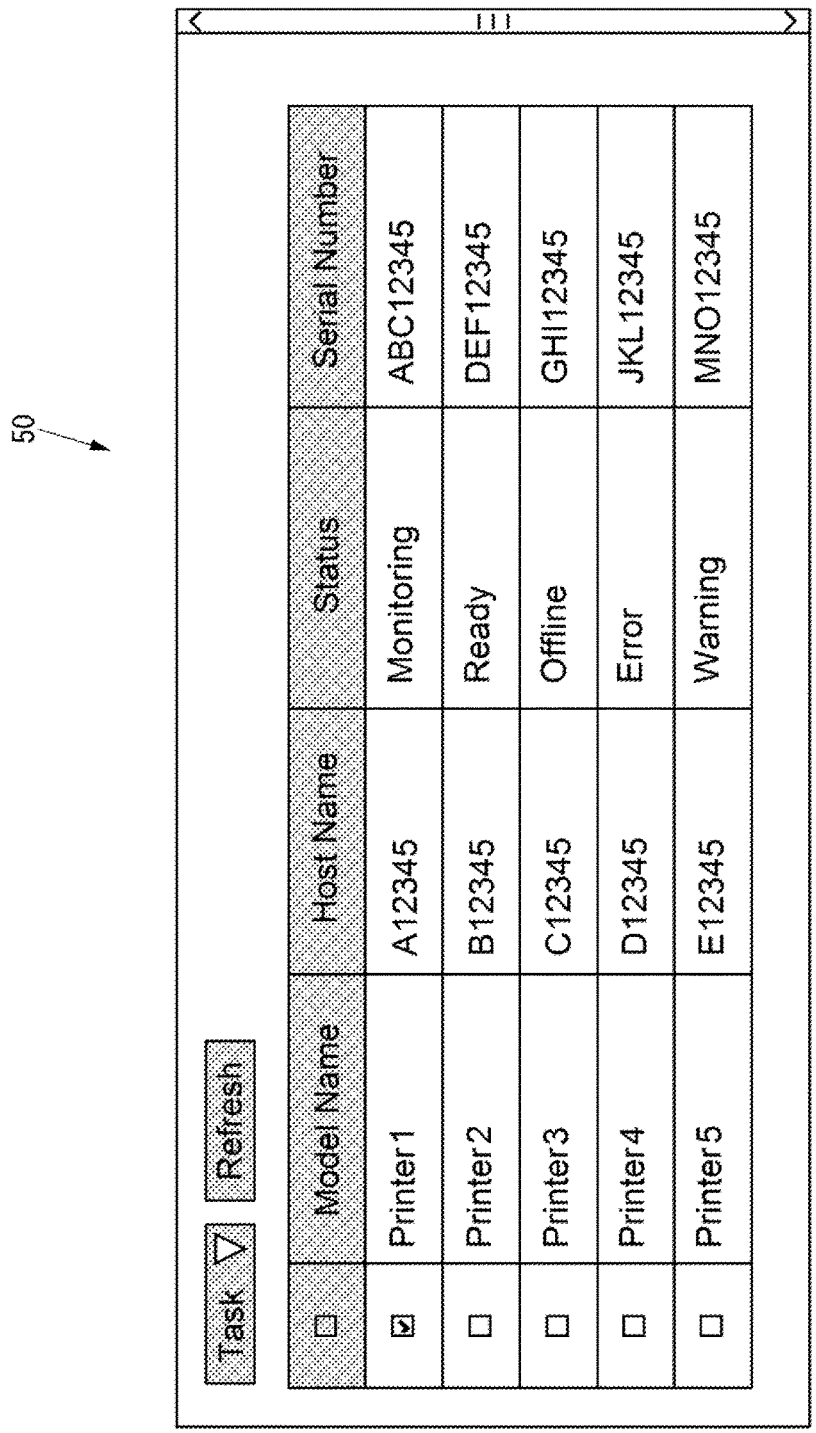
FIG. 11 illustrates an exemplary device-information-containing screen displayed on a display according to the one embodiment.

FIG. 11 illustrates an exemplary device-information-containing screen displayed on the display 32.

The device-information-containing screen illustrated in FIG. 11 is an image-forming-apparatus management screen 50 showing a list of image forming apparatuses registered as the management objects by the management server 30. The image-forming-apparatus management screen 50 is configured based on the device information stored in the device information database 34b. In the image-forming-apparatus management screen 50, any of "Monitoring," "Ready," "Warning," "Error," and "Offline" is displayed in a status field.

"Monitoring" is displayed when the connection type is the XMPP connection non-permission mode. "Monitoring" indicates a state where the management server 30 is monitoring the device information transmitted from the image forming apparatus to the management server 30 via the HTTP connection.

"Ready," "Warning," "Error," and "Offline" are displayed when the connection type is the XMPP connection permission mode. "Ready" indicates a state where the behavior of the image forming apparatus is ready. "Warning" indicates a state where a warning is issuing in the image forming apparatus. "Error" indicates a state where an error is occurring in the image forming apparatus. "Offline" indicates a state where the communication via the XMPP connection is impossible such that a power source of the image forming apparatus is down or a network adapter of the image forming apparatus has fallen off.

The following describes a behavior of the management system 10 when the management server 30 operates the image forming apparatus 20 via the XMPP connection 12.

Figure 12:
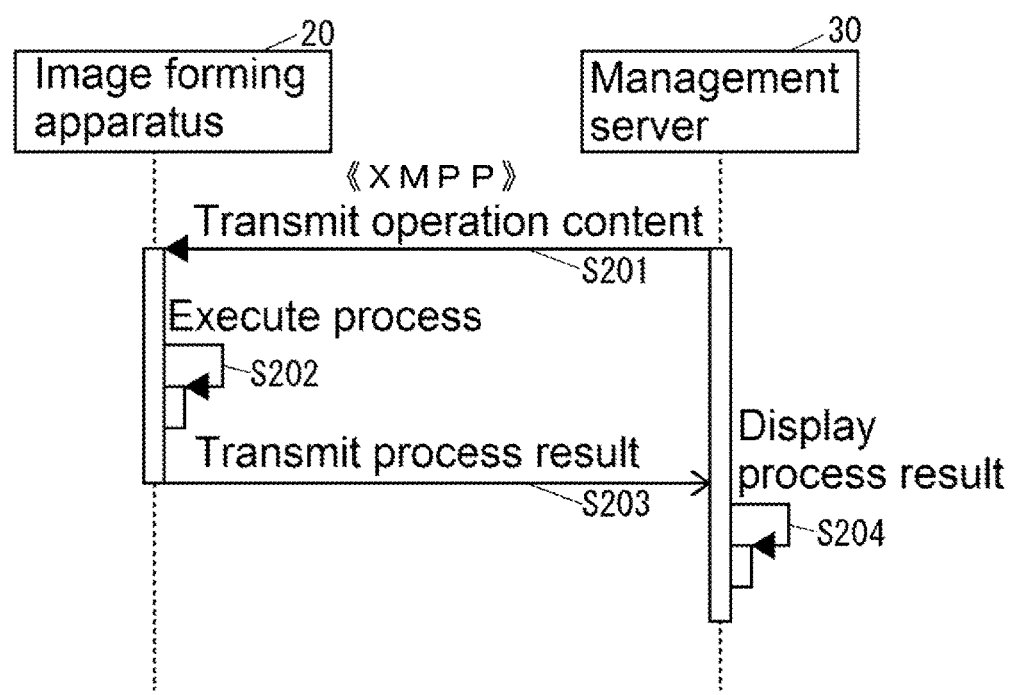
FIG. 12 illustrates a behavior of the management system according to the one embodiment when the management server operates the image forming apparatus via an XMPP connection.

FIG. 12 illustrates the behavior of the management system 10 when the management server 30 operates the image forming apparatus 20 via the XMPP connection 12.

The control unit 35 of the management server 30 executes the behavior illustrated in FIG. 12 when an instruction of an operation content with respect to the image forming apparatus 20 is issued from the operation unit 31 in a state where the XMPP connection 12 has been established with the image forming apparatus 20.

As illustrated in FIG. 12, the device operation unit 35b of the management server 30 transmits the operation content with respect to the image forming apparatus 20, for which the instruction is issued from the operation unit 31, to the image forming apparatus 20 via the XMPP connection 12 (Step S201).

When the process execution unit 28c of the image forming apparatus 20 receives the operation content transmitted from the management server 30 at Step S201, the process execution unit 28c executes a process corresponding to the received operation content (Step S202), and then, transmits a result of the process (hereinafter referred to as a "process result") executed at Step S202 to the management server 30 via the XMPP connection 12 (Step S203).

When the device operation unit 35b of the management server 30 receives the process result transmitted from the image forming apparatus 20 at Step S203, the device operation unit 35b displays the received process result on the display 32 (Step S204).

The management server 30 receives the instruction of the operation content with respect to the image forming apparatus 20 via the operation unit 31 to display the process result by the image forming apparatus 20 on the display 32 in the behavior illustrated in FIG. 12. However, the management server 30 also can receive the instruction of the operation content with respect to the image forming apparatus 20 from a computer such as an external PC via the communication unit 33, not receiving the instruction via the operation unit 31. When the management server 30 receives the instruction of the operation content with respect to the image forming apparatus 20 from the external computer, the management server 30 may transmit the process result by the image forming apparatus 20 to a computer as a transmission source of the instruction of the operation content with respect to the image forming apparatus 20 via the communication unit 33, not displaying the process result on the display 32.

The following describes a behavior of the management system 10 when the connection type in the connection type information 27b is switched from the XMPP connection permission mode to the XMPP connection non-permission mode in the state where the image forming apparatus 20 has been registered as the management object in the management server 30.

Figure 13:
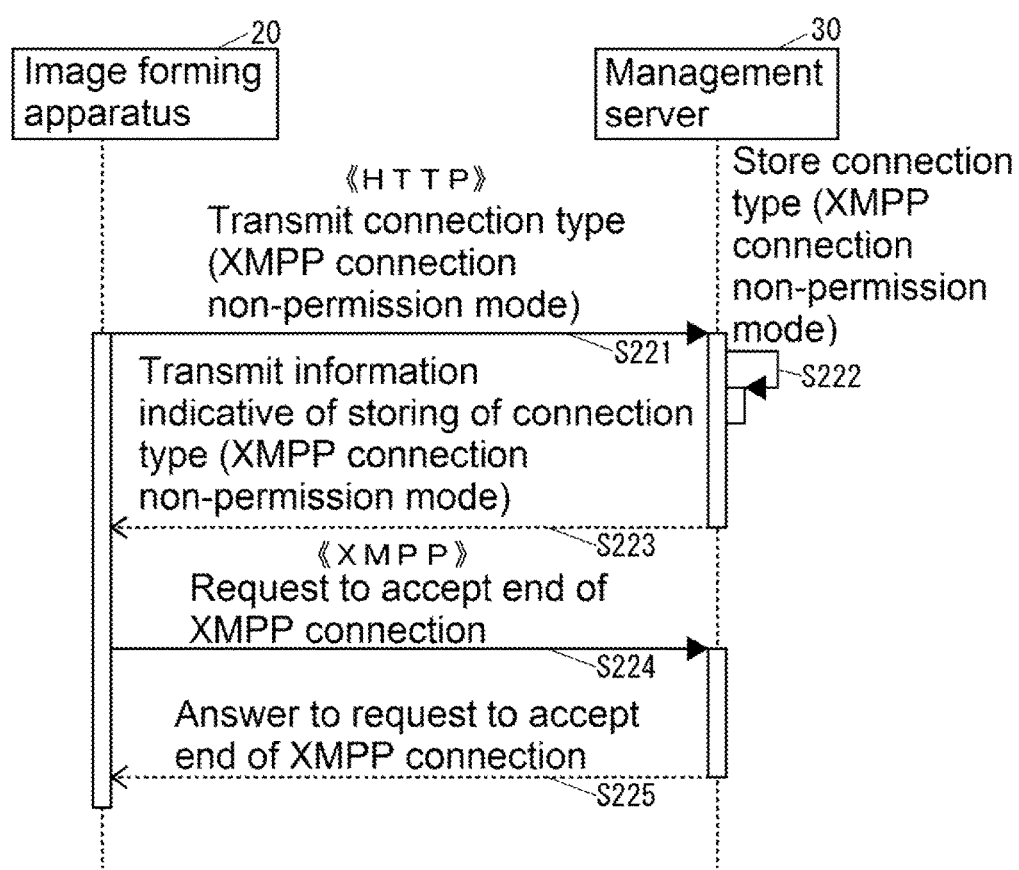
FIG. 13 illustrates a behavior of the management system according to the one embodiment when, in the state where the image forming apparatus has been registered as the management object in the management server, the connection type in the connection type information is switched from the XMPP connection permission mode to the XMPP connection non-permission mode.

FIG. 13 illustrates the behavior of the management system 10 when the connection type in the connection type information 27b is switched from the XMPP connection permission mode to the XMPP connection non-permission mode in the state where the image forming apparatus 20 has been registered as the management object in the management server 30.

The control unit 28 of the image forming apparatus 20 executes the behavior illustrated in FIG. 13 when the connection type in the connection type information 27b is switched from the XMPP connection permission mode to the XMPP connection non-permission mode in the state where the image forming apparatus 20 has been registered as the management object in the management server 30.

As illustrated in FIG. 13, the device information transmitting unit 28a of the image forming apparatus 20 transmits the connection type in the connection type information 27b to the management server 30 via the HTTP connection 11 (Step S221).

When the device information managing unit 35a of the management server 30 receives the connection type transmitted from the image forming apparatus 20 at Step S221, the device information managing unit 35a executes processes of Steps S222 and S223, similarly to Steps S122 and S123.

When the connection type switching unit 28b of the image forming apparatus 20 receives the information transmitted from the management server 30 at Step S223, the connection type switching unit 28b requests the management server 30 to accept an end of the XMPP connection 12 (Step S224).

When the device operation unit 35b of the management server 30 is requested to accept the end of the XMPP connection 12 by the image forming apparatus 20 at Step S224, the device operation unit 35b answers the request to accept the end of the XMPP connection 12 to the image forming apparatus 20 (Step S225).

As described above, the XMPP connection 12 is ended.

The connection type switching unit 28b of the image forming apparatus 20 also can automatically switch the connection type in the connection type information 27b from the XMPP connection permission mode to the XMPP connection non-permission mode when the automatic switch information in the connection type information 27b is "ON," not only switching the connection type in the connection type information 27b from the XMPP connection permission mode to the XMPP connection non-permission mode corresponding to the instruction via the operation unit 21.

The following describes a case where the connection type in the connection type information 27b is automatically switched from the XMPP connection permission mode to the XMPP connection non-permission mode.

Figure 14:
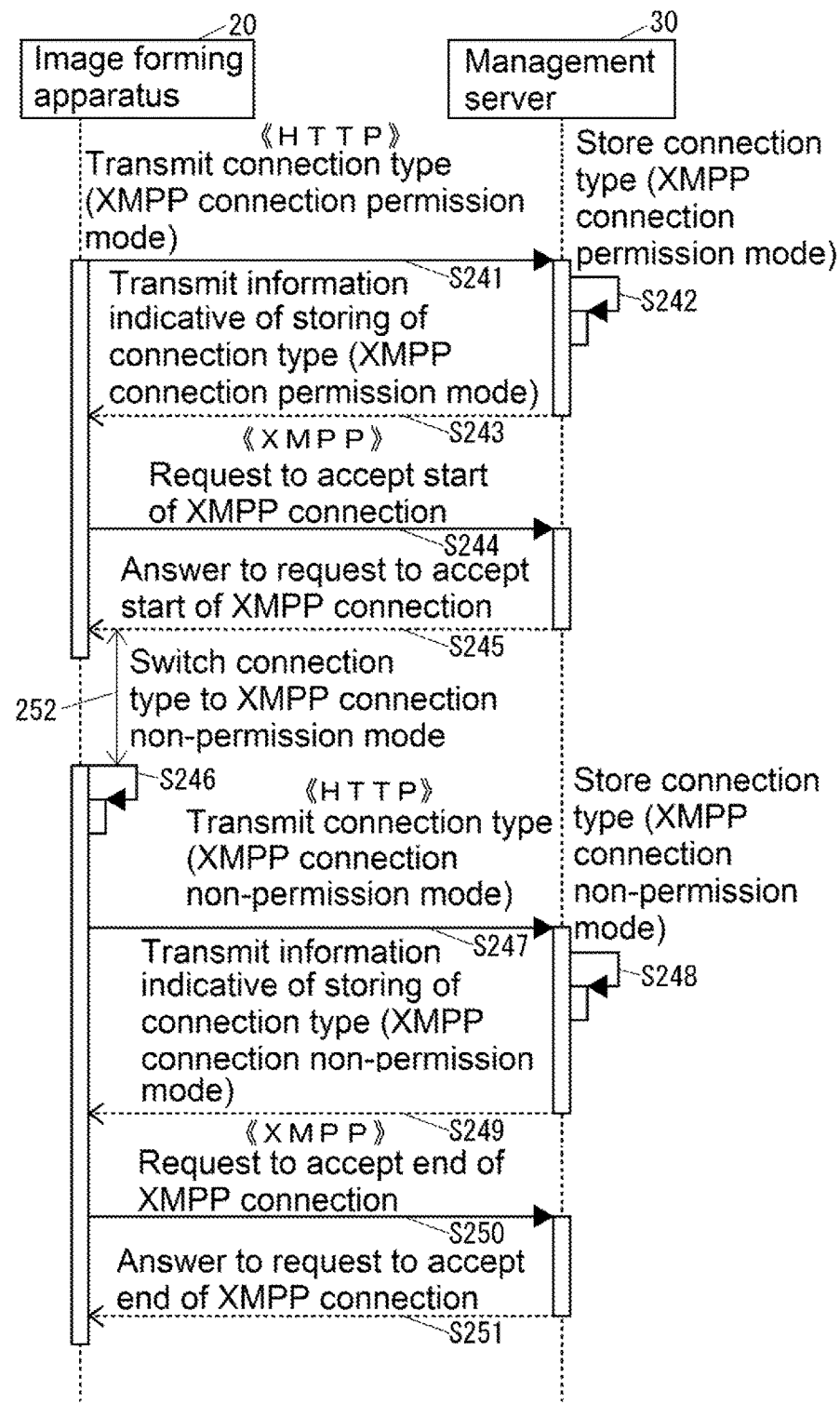
FIG. 14 illustrates a behavior of the management system according to the one embodiment when, after a start of the XMPP connection, a long time has passed such that the management server never operates the image forming apparatus via the XMPP connection.

FIG. 14 illustrates a behavior of the management system 10 when, after the start of the XMPP connection 12, a long time has passed such that the management server 30 never operates the image forming apparatus 20 via the XMPP connection 12.

In FIG. 14, processes at Steps S241 to S245 are similar to the processes at Steps S121 to S125 or the processes at Steps S161 to S165 when the connection type in the connection type information 27b is the XMPP connection permission mode.

Processes at Steps S247 to S251 are similar to the processes at Steps S221 to S225.

When the automatic switch information in the connection type information 27b is "ON," the connection type switching unit 28b of the image forming apparatus 20 automatically switches the connection type in the connection type information 27b from the XMPP connection permission mode to the XMPP connection non-permission mode (Step S246) if an elapsed time 252 from the start of the XMPP connection 12 exceeds an automatic switching time in the connection type information 27b without operating the image forming apparatus 20 by the management server 30 via the XMPP connection 12 after the XMPP connection 12 has been started at Step S245.

Accordingly, in the management system 10, after the process at Step S246, the processes at Steps S247 to S251 are executed to end the XMPP connection 12.

Figure 15:
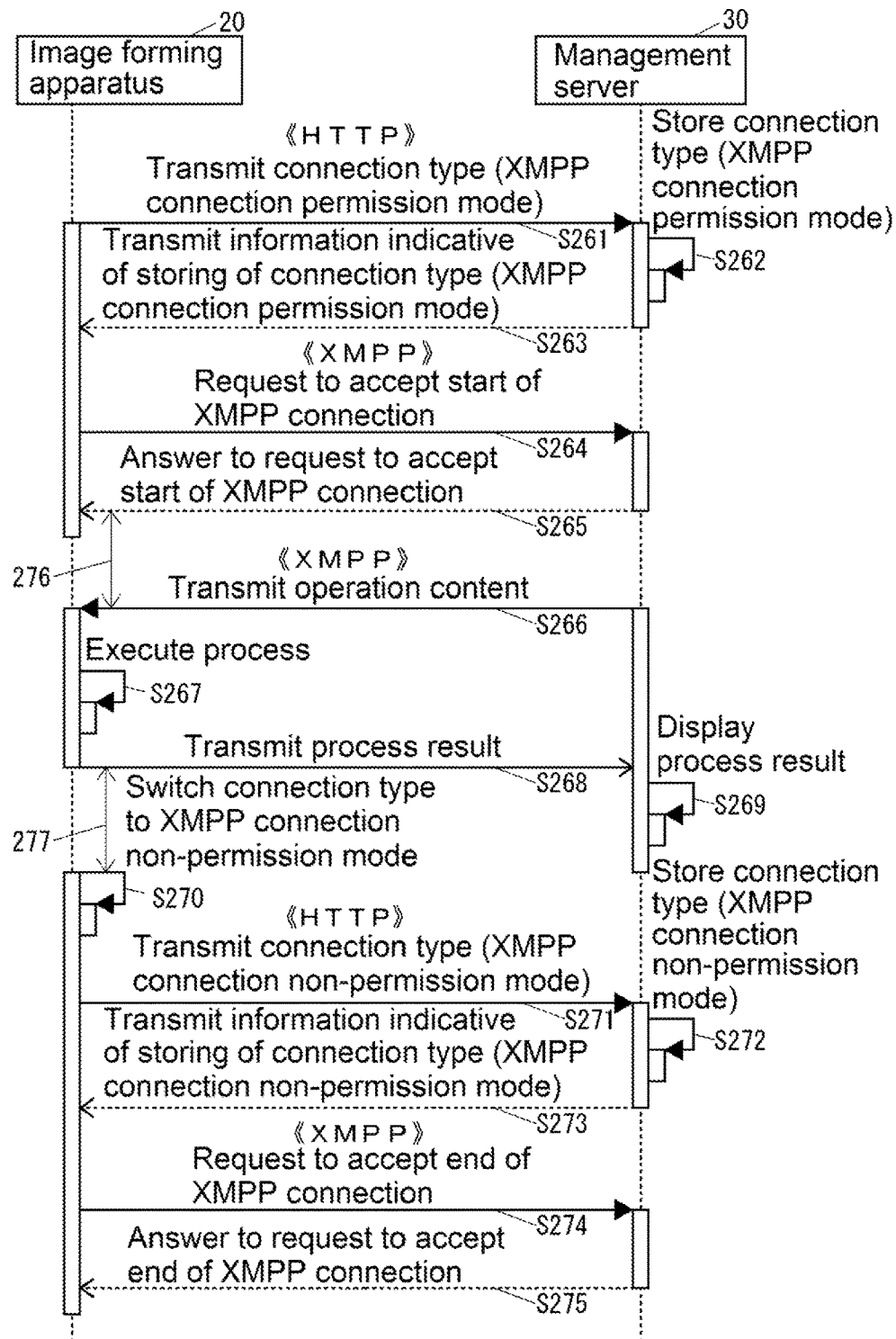
FIG. 15 illustrates a behavior of the management system according to the one embodiment when, after the start of the XMPP connection, the management server had operated the image forming apparatus via the XMPP connection, and then, the long time has passed.

FIG. 15 illustrates a behavior of the management system 10 when the management server 30 had operated the image forming apparatus 20 via the XMPP connection 12 after the start of the XMPP connection 12, and then, a long time has passed.

In FIG. 15, processes at Steps S261 to S265 are similar to the processes at Steps S121 to S125 or the processes at Steps S161 to S165 when the connection type in the connection type information 27b is the XMPP connection permission mode.

Processes at Steps S266 to S269 are similar to the processes at Steps S201 to S204.

Processes at Steps S271 to S275 are similar to the processes at Steps S221 to S225.

When the automatic switch information in the connection type information 27b is "ON," the connection type switching unit 28b of the image forming apparatus 20 does not automatically switch the connection type in the connection type information 27b from the XMPP connection permission mode to the XMPP connection non-permission mode if the image forming apparatus 20 receives the operation content transmitted from the management server 30 via the XMPP connection 12 at Step S266 before an elapsed time 276 from the start of the XMPP connection 12 exceeds the automatic switching time in the connection type information 27b, after the XMPP connection 12 has been started at Step S265.

Then, the connection type switching unit 28b automatically switches the connection type in the connection type information 27b from the XMPP connection permission mode to the XMPP connection non-permission mode (Step S270) when, after the image forming apparatus 20 has transmitted the process result of the process executed at Step S267 corresponding to the operation content transmitted from the management server 30 at Step S266 to the management server 30 via the XMPP connection 12 at Step S268, an elapsed time 277 from the transmission of the process result via the XMPP connection 12 exceeds the automatic switching time in the connection type information 27b without operating the image forming apparatus 20 by the management server 30 via the XMPP connection 12. Accordingly, in the management system 10, after the process at Step S270, the processes at Steps S271 to S275 are executed to end the XMPP connection 12.

In the example illustrated in FIG. 15, the management server 30 transmits the operation content to the image forming apparatus 20 via the XMPP connection 12 only once. However, the management server 30 also can transmit the operation content to the image forming apparatus 20 via the XMPP connection 12 several times between the start and the end of the XMPP connection 12. When the management server 30 transmits the operation content to the image forming apparatus 20 via the XMPP connection 12 several times between the start and the end of the XMPP connection 12, the connection type switching unit 28b does not automatically switch the connection type in the connection type information 27b from the XMPP connection permission mode to the XMPP connection non-permission mode if, after the image forming apparatus 20 has transmitted the process result of the process executed corresponding to the operation content transmitted from the management server 30 to the management server 30 via the XMPP connection 12, the image forming apparatus 20 receives a new operation content transmitted from the management server 30 via the XMPP connection 12 before an elapsed time from the transmission of the process result via the XMPP connection 12 exceeds the automatic switching time in the connection type information 27b. Then, the connection type switching unit 28b automatically switches the connection type in the connection type information 27b from the XMPP connection permission mode to the XMPP connection non-permission mode when, after the image forming apparatus 20 has transmitted the process result of the process executed corresponding to the operation content transmitted from the management server 30 to the management server 30 via the XMPP connection 12, the elapsed time from the transmission of the process result via the XMPP connection 12 exceeds the automatic switching time in the connection type information 27b such that the image forming apparatus 20 is not operated by the management server 30 via the XMPP connection 12.

As described above, in the management system 10, the management server 30 can operate the image forming apparatus via the XMPP connection between the image forming apparatus and the management server 30. Thus, an administrator of the image forming apparatus such as the service person of the image forming apparatus can operate the image forming apparatus via the management server 30, for example, without directly operating the image forming apparatus by proceeding to an installation location of the image forming apparatus. This can improve a convenience of the operation with respect to the image forming apparatus.

For example, in the management system 10, the administrator of the image forming apparatus can remotely operate the image forming apparatus via the management server 30 when various problems such as a system error, a paper jam, and a component failure occur on the image forming apparatus. This improves a possibility that the problems occurred on the image forming apparatus are quickly solved.

In the management system 10, the image forming apparatus can switch the XMPP connection between the image forming apparatus and the management server 30 between enabling and disabling (Steps S104, S246, and S270). This can reduce a state where the management server 30 can operate the image forming apparatus from continuing for a long time to improve a sense of security of the user of the image forming apparatus.

In the management system 10, the image forming apparatus can switch the XMPP connection between the image forming apparatus and the management server 30 between enabling and disabling. This can reduce a volume of communication in the network of the user of the image forming apparatus due to a long-time continuation of the XMPP connection. When the user of the image forming apparatus bears a communication fee corresponding to the volume of communication in the network of the user of the image forming apparatus, the management system 10 can reduce the volume of communication in the network of the user of the image forming apparatus to reduce the communication fee borne by the user of the image forming apparatus.

In the management system 10, the image forming apparatus automatically disables the XMPP connection when a continuance of a specific state exceeds a specific time after the start of the XMPP connection between the image forming apparatus and the management server 30 (Steps S246 and S270). This can reduce the state where the management server 30 can operate the image forming apparatus from continuing for a long time to improve the sense of security of the user of the image forming apparatus, even when the user of the image forming apparatus cannot input an operation to disable the XMPP connection to the image forming apparatus at an appropriate timing.

For example, in the management system 10, when the user of the image forming apparatus does not use the image forming apparatus at night, if the management server 30 executes a process taking time such as upgrading of the firmware of the image forming apparatus with respect to the image forming apparatus via the XMPP connection at night, the image forming apparatus can automatically disable the XMPP connection after the end of the process. This can improve the sense of security of the user of the image forming apparatus.

The management system 10 accepts a specification of a time as a reference when the image forming apparatus automatically disables the XMPP connection between the image forming apparatus and the management server 30 (Steps S101 to S104). This can improve the convenience of the user of the image forming apparatus.

In the management system 10, the time as the reference when the image forming apparatus automatically disables the XMPP connection may be fixed, or it is not necessary to have a configuration where the image forming apparatus automatically disables the XMPP connection.

In the management system 10, even when the XMPP connection between the image forming apparatus and the management server 30 is not executed, the management server 30 can give notice of the device information received at Steps S121, S141, S161, S221, S241, S247, S261, and S271 from the image forming apparatus by the management server 30 via the HTTP connection between the image forming apparatus and the management server 30 (Step S182). This can cause the administrator of the image forming apparatus to determine whether the image forming apparatus should be operated or not based on the notice by the management server 30 to improve the convenience.

In the management system 10, the management server 30 can give notice of a state whether the image forming apparatus has enabled the XMPP connection between the image forming apparatus and the management server 30 or not, that is, a state whether the connection type in the connection type information stored in the image forming apparatus is the XMPP connection permission mode or not (Step S182). This can cause the administrator of the image forming apparatus to determine whether it is the image forming apparatus operable via the management server 30 or not based on the notice by the management server 30 to improve the convenience.

In the embodiment, the management system 10 employs the HTTP as the protocol for the temporal connection. However, the management system 10 may employ a protocol other than the HTTP as the protocol for the temporal connection.

In the embodiment, the management system 10 employs the XMPP as the protocol for the constant connection. However, the management system 10 may employ a protocol other than the XMPP as the protocol for the constant connection.

Exemplary Embodiment of the Disclosure

The management system of the disclosure includes an image forming apparatus, and a management server that manages the image forming apparatus. The image forming apparatus is configured to switch a constant connection with the management server by a protocol for the constant connection between enabling and disabling. The management server is configured to operate the image forming apparatus via the constant connection.

With this configuration, in the management system of the disclosure, the management server can operate the image forming apparatus via the constant connection between the image forming apparatus and the management server. Thus, the administrator of the image forming apparatus can operate the image forming apparatus via the management server without directly operating the image forming apparatus by proceeding to the installation location of the image forming apparatus. This can improve the convenience of the operation with respect to the image forming apparatus. In the management system of the disclosure, the image forming apparatus can switch the constant connection between the image forming apparatus and the management server between enabling and disabling. This can reduce the state where the management server can operate the image forming apparatus from continuing for a long time to improve the sense of security of the user of the image forming apparatus.

In the management system of the disclosure, the image forming apparatus may automatically disable the constant connection when a continuance of a specific state exceeds a specific time after a start of the constant connection With this configuration, in the management system of the disclosure, the image forming apparatus automatically disables the constant connection when the continuance of the specific state exceeds the specific time after the start of the constant connection between the image forming apparatus and the management server. This can reduce the state where the management server can operate the image forming apparatus from continuing for a long time to improve the sense of security of the user of the image forming apparatus, even when the user of the image forming apparatus cannot input the operation to disable the constant connection to the image forming apparatus at an appropriate timing.

In the management system of the disclosure, the image forming apparatus may accept a specification of the specific time.

With this configuration, the management system of the disclosure accepts the specification of the time as the reference when the image forming apparatus automatically disables the constant connection between the image forming apparatus and the management server. This can improve the convenience of the user of the image forming apparatus.

In the management system of the disclosure, the image forming apparatus may transmit information on the image forming apparatus to the management server via a temporal connection with the management server by a protocol for the temporal connection, and the management server may be configured to give notice of the information on the image forming apparatus received from the image forming apparatus.

With this configuration, in the management system of the disclosure, even when the constant connection between the image forming apparatus and the management server is not executed, the management server can give notice of the device information received from the image forming apparatus. This can cause the administrator of the image forming apparatus to determine whether the image forming apparatus should be operated or not based on the notice by the management server to improve the convenience.

In the management system of the disclosure, the management server may be configured to give notice of a state whether the image forming apparatus has enabled the constant connection or not.

With this configuration, in the management system of the disclosure, the management server can give notice of the state whether the image forming apparatus has enabled the constant connection between the image forming apparatus and the management server or not. This can cause the administrator of the image forming apparatus to determine whether it is the image forming apparatus operable via the management server or not based on the notice by the management server to improve the convenience.

An image forming apparatus of the disclosure is configured to switch a constant connection with a management server that manages the image forming apparatus between enabling and disabling. The management server is configured to operate the image forming apparatus via the constant connection by a protocol for the constant connection.

With this configuration, the image forming apparatus of the disclosure can be operated by the management server via the constant connection with the management server. Thus, the administrator of the image forming apparatus can operate the image forming apparatus via the management server without directly operating the image forming apparatus by proceeding to the installation location of the image forming apparatus. This can improve a convenience of the operation. The image forming apparatus of the disclosure can switch the constant connection with the management server between enabling and disabling. This can reduce the state where the management server can operate the image forming apparatus from continuing for a long time to improve the sense of security of the user of the image forming apparatus.

An image forming apparatus program of the disclosure is an image forming apparatus program executed by an image forming apparatus. The image forming apparatus program is configured to cause the image forming apparatus to function to switch a constant connection with a management server that manages the image forming apparatus between enabling and disabling. The management server is configured to operate the image forming apparatus via the constant connection by a protocol for the constant connection.

With this configuration, the image forming apparatus that executes the image forming apparatus program of the disclosure can be operated by the management server via the constant connection with the management server. Thus, the administrator of the image forming apparatus can operate the image forming apparatus via the management server without directly operating the image forming apparatus by proceeding to the installation location of the image forming apparatus. This can improve the convenience of the operation. The image forming apparatus that executes the image forming apparatus program of the disclosure can switch the constant connection with the management server between enabling and disabling. This can reduce the state where the management server can operate the image forming apparatus from continuing for a long time to improve the sense of security of the user of the image forming apparatus.

A management server of the disclosure is a management server that manages an image forming apparatus. The management server is configured to operate the image forming apparatus via a constant connection with the image forming apparatus. The image forming apparatus is configured to switch the constant connection with the management server by a protocol for the constant connection between enabling and disabling. The management server is configured to give notice of a state whether the image forming apparatus has enabled the constant connection or not.

With this configuration, the management server of the disclosure can operate the image forming apparatus via the constant connection with the image forming apparatus. Thus, the administrator of the image forming apparatus can operate the image forming apparatus via the management server without directly operating the image forming apparatus by proceeding to the installation location of the image forming apparatus. This can improve the convenience of the operation with respect to the image forming apparatus. The management server of the disclosure can give notice of a state whether the image forming apparatus has enabled the constant connection with the image forming apparatus or not. This can cause the administrator of the image forming apparatus to determine whether it is the image forming apparatus operable via the management server or not based on the notice by the management server to improve the convenience.

A management server program of the disclosure is a management server program executed by a management server that manages an image forming apparatus. The management server program is configured to cause the management server to function to operate the image forming apparatus via a constant connection with the image forming apparatus. The image forming apparatus is configured to switch the constant connection with the management server by a protocol for the constant connection between enabling and disabling. The management server program is configured to cause the management server to function to give notice of a state whether the image forming apparatus has enabled the constant connection or not.

With this configuration, the management server that executes the management server program of the disclosure can operate the image forming apparatus via the constant connection with the image forming apparatus. Thus, the administrator of the image forming apparatus can operate the image forming apparatus via the management server without directly operating the image forming apparatus by proceeding to the installation location of the image forming apparatus. This can improve the convenience of the operation with respect to the image forming apparatus. The management server that executes the management server program of the disclosure can give notice of the state whether the image forming apparatus has enabled the constant connection with the image forming apparatus or not. This can cause the administrator of the image forming apparatus to determine whether it is the image forming apparatus operable via the management server or not based on the notice by the management server to improve the convenience.

Effect of the Disclosure

The management system, the image forming apparatus, the image formation device program, the management server, and the management server program of the disclosure can improve the convenience of the operation with respect to the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A management system comprising:
   an image forming apparatus; and
   a management server that manages the image forming apparatus; wherein
   the image forming apparatus comprises a storage device which stores connection type information indicative of whether a constant connection with the management server is permissible or not
   the image forming apparatus is configured to switch the constant connection with the management server by a protocol for the constant connection between enabling and disabling,
   the image forming apparatus transmits the connection type information to the management server via a temporal connection with the management server by a protocol for the temporal connection;
   the management server receives the connection type information;
   i) when the received connection type information indicates that the constant connection is permissible, the constant connection is established between the management server and the image forming apparatus, and ii) when the received connection type information indicates that the constant connection is not permissible, the constant connection is not established between the management server and the image forming apparatus;
   the management server transmits an operation content to the image forming apparatus via the constant connection;
   the image forming apparatus (i) receives the operation content, (ii) executes a process according to the received operation content, and (iii) transmits a result of the process to the management server via the constant connection, and
   the management server receives the result of the process via the constant connection.

2. The management system according to claim 1, wherein the image forming apparatus automatically disables the constant connection when a continuance of a specific state exceeds a specific time after a start of the constant connection.

3. The management system according to claim 2, wherein the image forming apparatus accepts a specification of the specific time.

4. The management system according to claim 1, wherein the management server is configured to give notice of a state whether the image forming apparatus has enabled the constant connection or not.

5. An image forming apparatus comprising:
   a storage device which stores connection type information indicative of whether a constant connection with a management server is permissible or not;
   wherein:
   the image forming apparatus is configured to transmits the connection type information to the management server via a temporal connection with the management server by a protocol for the temporal connection;
   i) when the connection type information, which is transmitted to the management server, indicates that the constant connection is permissible, the constant connection is established between the image forming apparatus and the management server, and ii) when the connection type information, which is transmitted to the management server, indicates that the constant connection is not permissible, the constant connection is not established between the image forming apparatus and the management server;
   the image forming apparatus executes a process according to an operation content transmitted from the management server via the constant connection, and
   the image forming apparatus is configured to switch a constant connection with a management server that manages the image forming apparatus between enabling and disabling.

6. A management server that manages an image forming apparatus, wherein:
   the management server receives connection type information via a temporal connection with the image forming apparatus by a protocol for the temporal connection, the connection type information being indicative of whether a constant connection with the image forming apparatus is permissible or not;
   when the connection type information received from the image forming apparatus indicates that the constant connection is permissible, (i) the management server transmits an operation content to the image forming apparatus via the constant connection with the image forming apparatus, the image forming apparatus being configured to switch the constant connection with the management server by a protocol for the constant connection between enabling and disabling, (ii) the image forming apparatus executes a process according to the received operation content, and transmits a result of the process to the management server via the constant connection, and (iii) the management server receives the result of the process;
   when the connection type information received from the image forming apparatus indicates that the constant connection is not permissible, the constant connection is not established between the management server and the image forming apparatus; and
   the management server is configured to give notice of a state whether the image forming apparatus has enabled the constant connection or not.

* * * * *